No. 754,873. PATENTED MAR. 15, 1904.
S. V. IVY.
BOLL WEEVIL CATCHER.
APPLICATION FILED NOV. 14, 1903.
NO MODEL. 2 SHEETS—SHEET 1.
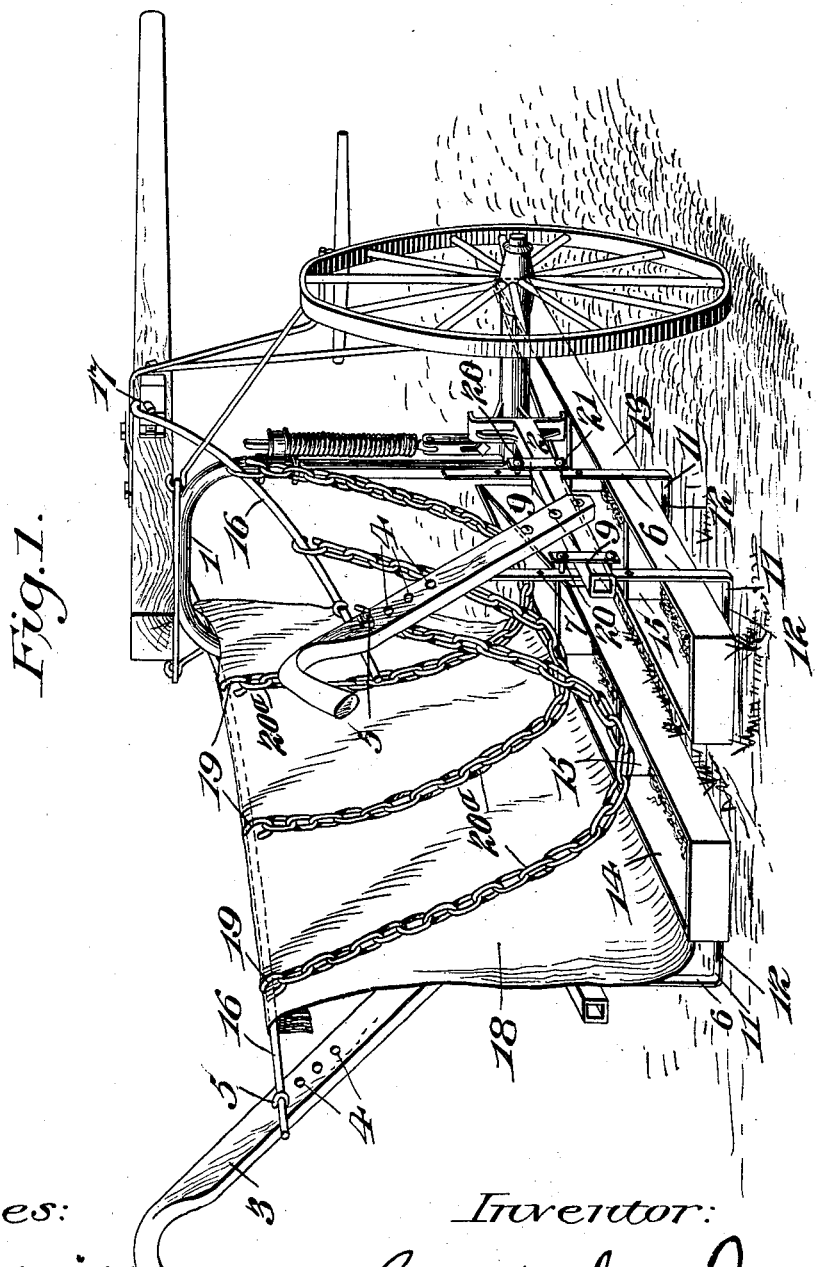

No. 754,873. PATENTED MAR. 15, 1904.
S. V. IVY.
BOLL WEEVIL CATCHER.
APPLICATION FILED NOV. 14, 1903.
NO MODEL. 2 SHEETS—SHEET 2.
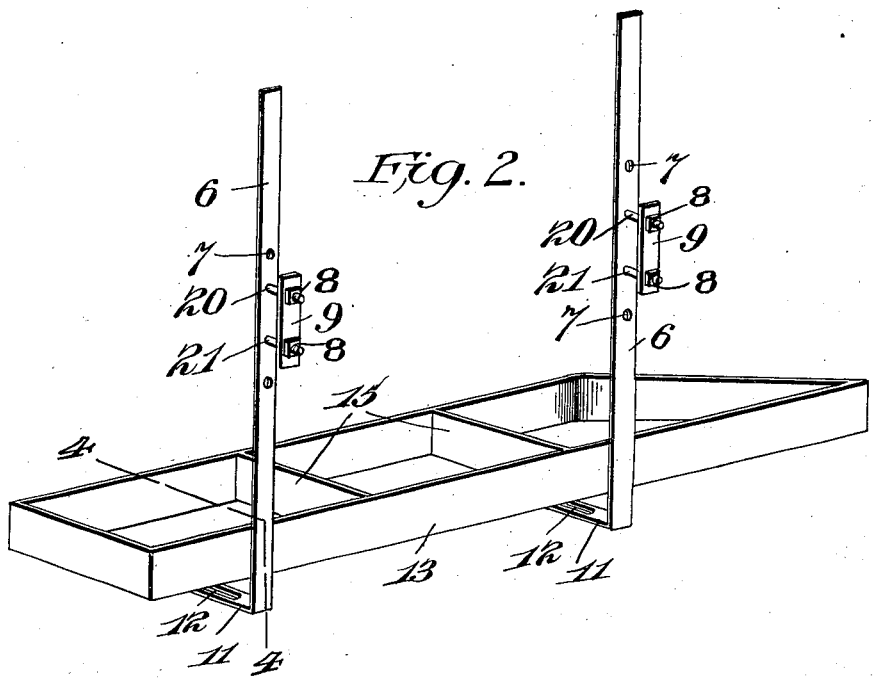
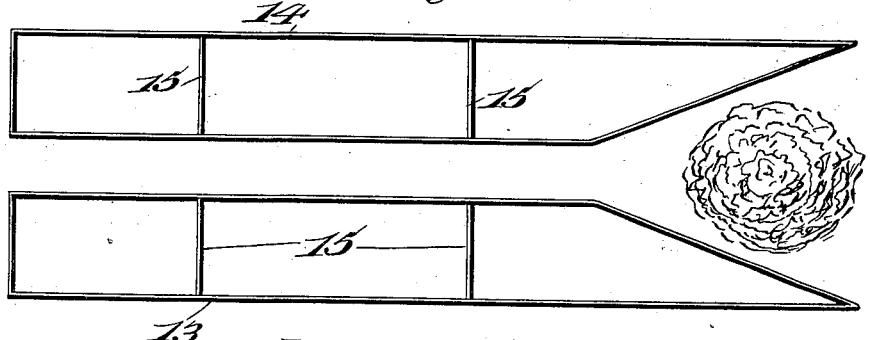
Witnesses: Inventor:
Sandford V Ivy
By Ralston & Siddons, attys No. 754,873. Patented March 15, 1904.

UNITED STATES PATENT OFFICE.

SANFORD V. IVY, OF BUTLER, TEXAS.

BOLL-WEEVIL CATCHER.

SPECIFICATION forming part of Letters Patent No. 754,873, dated March 15, 1904.

Application filed November 14, 1903. Serial No. 181,233. (No model.)

*To all whom it may concern:*

Be it known that I, SANFORD V. IVY, a citizen of the United States, residing at Butler, in the county of Freestone and State of Texas, have invented certain new and useful Improvements in Boll-Weevil Catchers, of which the following is a specification.

My invention relates to boll-weevil catchers, the object of which is to provide a machine of this character that will effectively catch and destroy boll-weevils or other insects or worms and remove from the growing cotton diseased or defective squares; and with these objects in view my invention consists of the parts and combination of parts, as will hereinafter be more fully pointed out.

In the drawings, Figure 1 is a perspective view of a cultivator of approved type with my invention attached. Fig. 2 is a perspective view of one of the pans and suspending means detached. Fig. 3 is a top plan view of the pans, showing their relative position. Fig. 4 is a vertical section on the line 4 4, Fig. 2, the hanger being broken away.

1 represents a cultivator of approved type, such as is commonly used to cultivate the cotton-plant, having rearwardly-extending arms or beams 2 connected to the axle. 3 represents handles secured in any suitable manner to said beams, said handles being provided with a series of bolt-openings 4, as shown in Fig. 1, in which an eyebolt 5 is detachably secured.

6 represents supports or hangers having a series of bolt-holes 7, in which the bolts 8 are secured. 9 represents clamping-plates which by means of the bolts 20 and 21 are secured to said hangers, whereby the hangers are adjustably secured to the beams 2, as shown in Fig. 1. The lower end of these hangers is bent at a right angle to the hanger to form a foot 11, which is provided with an elongated slot 12, to be hereinafter referred to.

13 and 14 are pans of similar construction, each having a depending screw-threaded lug $15^a$ on the bottom thereof, which projects through the elongated slot 12, as shown in Fig. 4, whereby the pans are held firmly on said foot 11 in any adjusted position by tightening the nut $15^b$. These pans are beveled at the front end—that is to say, the bevel on one pan is to the right, while the bevel on the other is to the left. Thus when the pans are brought together in operative position they form a funnel-shaped opening, into which the cotton-plants pass, and are thus gently fed in between the pans. Each pan is divided into three separate compartments by means of the partitions 15, each of which is adapted to hold kerosene or other suitable oil.

16 represents rods, one end of each of which is secured to the cultivator, as at 17, while the other end is passed loosely through the eyebolts 5, the position of the rods 16 being dependent upon the adjustment of the bolts 5 in the series of bolt-openings 4 in the handles.

18 represents curtains, the lower edge of each of which is riveted or otherwise suitably secured to the outer side wall of the pans, while the upper edge of the curtain is secured to the rods 16 in any suitable manner, as by a hook 19.

$20^a$ represents chains suspended between the rods 16, the ends of which are secured to said rods by the same hook that secures the curtains to the rods. These chains are comparatively heavy and hang down with their lowermost point near the top of the pans 13 and 14, as will be seen in Fig. 1.

The cultivator when equipped with my invention is driven along the rows of cotton, the pans passing along each side of the row and in close proximity thereto. The chains are thus drawn or dragged over the tops, limbs, and body of the cotton-stalks, falling quickly from limb to limb, knocking and shaking them in such a vigorous manner that all boll-weevils, insects, worms, and defective or diseased cotton-squares are knocked off of the cotton-plants without injuring the plants into the pans 13 and 14, and thus deposited in the kerosene or other oil contained in said pans, which immediately kills them or detains them in said pans. When the pans are sufficiently filled with "the catch," the operator empties them in piles at the end of a row completely saturated with the oil and ignites the oil, thereby completely consuming and destroying the entire mass. The vertical adjustment of the pans is accomplished by the bolts 20 and 21, as will be understood. The beams 2 being journaled upon the axle of the cultivator are capable of being swung up and down to enable the operator to regulate the position of the pans relatively to the plants by means of the handles.

The peculiar adaptation of my invention to a cultivator enables one to protect the plants from the weevil, insects, &c., simultaneously with the plowing or cultivation of the plants, thus saving time and extra labor, as the attachment of my device in no way interferes with the cultivator-teeth.

Having thus described the invention, the following is what is claimed as new therein:

1. In a weevil-catcher, the combination with the beams of a cultivator, of hangers adjustably secured to said beams and lateral extensions integral with said hangers, of pans adjustably secured to said extensions, chains suspended over the pans from the cultivator-frame.

2. In a weevil-catcher, the combination with the beams of a cultivator, of hangers adjustably secured to said beams, and lateral extensions integral with said hangers, of pans adjustably secured to said extensions, chains suspended over the pans from the cultivator-frame, and shields connected to the pans and cultivator-frame.

3. In combination with a cultivator, a weevil-catcher comprising hangers adjustably secured to the beams of the cultivator, lateral extensions integral with said hangers, pans adjustably secured to said extensions, and spaced apart, rods secured to the cultivator, curtains extending from said rods to each pan, and chains suspended over the pans from the said rods.

In testimony whereof I affix my signature in presence of two witnesses.

SANFORD V. IVY.

Witnesses:
   T. D. McILVIEN,
   H. B. DAVISS.